(12) United States Patent   (10) Patent No.: US 7,028,418 B1
Huang   (45) Date of Patent: Apr. 18, 2006

(54) INTEGRATED AND HYBRID SOLE CONSTRUCTION FOR FOOTWEAR

(75) Inventor: Ricky Huang, Carlsbad, CA (US)

(73) Assignee: ARCA Industrial Corp, New York, NY (US)

( * ) Notice: Subject to any disclaimer, the term of this patent is extended or adjusted under 35 U.S.C. 154(b) by 0 days.

(21) Appl. No.: 10/696,779

(22) Filed: Oct. 28, 2003

Related U.S. Application Data

(60) Provisional application No. 60/422,082, filed on Oct. 28, 2002.

(51) Int. Cl.
*A43C 13/08* (2006.01)
(52) U.S. Cl. .............. 36/12; 36/30 R; 36/4; 12/142 RS
(58) Field of Classification Search ............... 36/12, 36/14, 30 R, 4; 12/142 RS, 142 E, 142 T, 12/146 BR, 146 B See application file for complete search history.

(56) References Cited

U.S. PATENT DOCUMENTS

| | | | | |
|---|---|---|---|---|
| 2,306,306 A | * | 12/1942 | Ferrettie | 36/4 |
| 2,437,030 A | * | 3/1948 | Hoza | 36/14 |
| 4,676,010 A | * | 6/1987 | Cheskin | 36/32 R |
| 4,858,337 A | * | 8/1989 | Barma | 36/4 |
| 5,189,814 A | * | 3/1993 | Barma | 36/4 |
| 5,743,027 A | | 4/1998 | Barma | |
| 6,041,520 A | * | 3/2000 | Aoki | 36/14 |
| 6,558,784 B1 | * | 5/2003 | Norton et al. | 428/304.4 |
| 6,670,029 B1 | * | 12/2003 | Norton et al. | 428/304.4 |
| 2003/0084592 A1 | * | 5/2003 | Ho | 36/25 R |
| 2004/0020077 A1 | * | 2/2004 | Thomas et al. | 36/4 |

* cited by examiner

Primary Examiner—M. D. Patterson
(74) Attorney, Agent, or Firm—Fish & Richardson P.C.

(57) ABSTRACT

Techniques for fabricating footwear with an integrated and hybrid sole design where a non-rubber material is used to cross link with rubber. A vulcanizable polyurethane capable of being vulcanized to cross link with rubber may be used to construct the middle sole which is unified with a rubber upper portion and a rubber lower sole.

11 Claims, 3 Drawing Sheets

INTEGRATED AND HYBRID SOLE CONSTRUCTION FOR FOOTWEAR

This application claims priority from U.S. Provisional Application No. 60/422,082 filed Oct. 28, 2002, the entire disclosure of which is incorporated herein by reference.

BACKGROUND

This application generally relates to footwear products, and in particular, to structures and fabrication of rubber-based footwear.

Footwear may be constructed with a wide range of natural and synthetic materials. Selection of one or more materials for a footwear may be based on various considerations and purposes, including utility, durability, comfort, and ease of manufacturing. One of the frequently-used materials for footwear products is rubber materials. A rubber may be either a natural rubber material or a synthetic rubber material. The shoe sole of a footwear, for example, may be constructed by using one or more rubber parts or components. U.S. Pat. No. 5,743,027 issued on Apr. 28, 1998 to Barma describes an example of a rubber shoe sole formed from directly engaging adjacent rubber sole layers to each other by vulcanization at an elevated temperature. This technique allows the final shoe sole to have an integrated rubber structure.

SUMMARY

This application includes an integrated and hybrid sole construction for footwear that includes an upper portion, a middle sole, and a lower sole. The upper portion is configured to have a bottom rubber surface to interface with the middle sole. The lower rubber sole has a top rubber surface to interface with the middle sole. The middle sole is formed of a non-rubber material that is capable of being vulcanized to cross link with rubber. The middle sole is configured to have a first surface unified with the bottom rubber surface by cross linking caused by vulcanization, and a second opposing surface unified with the top rubber surface by cross linking caused by the vulcanization. The vulcanization process unifies the three parts to form a unibody structure.

These and other embodiments and features of the footwear structure and associated fabrication process are described in detail in the following drawings, the detailed description, and the claims.

DETAILED DESCRIPTION

The techniques and structures described in this application are in part based on the recognition that rubber materials have desired properties under both technical and commercial considerations for making shoe soles and other parts of footwear. In addition, it is recognized that all-rubber shoe soles may add weight to the footwear. Hence, all-rubber construction designs may be undesirable or inadequate for certain footwear products for usages where light weight is desirable or required.

Based on these and other considerations, this application provides, among others, integrated sole designs with a lightweight non-rubber middle sole sandwiched between an upper rubber portion and a lower rubber sole which may also be referred as the outer rubber sole. Notably, the lightweight middle sole is formed of a non-rubber material lighter than rubber and is capable of being vulcanized like rubber. Hence, a single vulcanization process may be performed to unify the middle sole with the upper portion and the lower sole by vulcanizing the non-rubber material and the rubber. Upon completion of this vulcanization, the three pieces are integrated as a single unitary unit. This construction is "hybrid" because the middle sole is formed of a material that is not rubber and is different from adjacent parts, i.e., the upper portion and the lower sole.

Figure 1A:
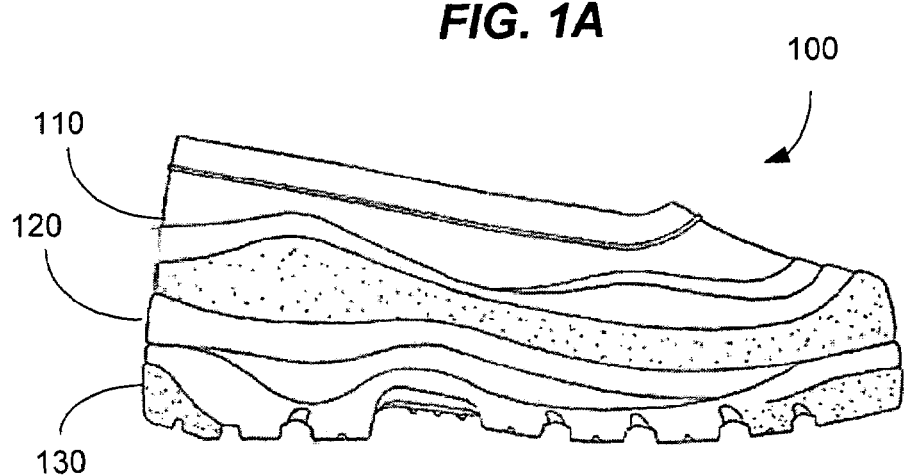
FIGS. 1A, 1B, 1C, and 1D illustrate one exemplary implementation of an integrated hybrid sole construction according to one embodiment.
Figure 1B:
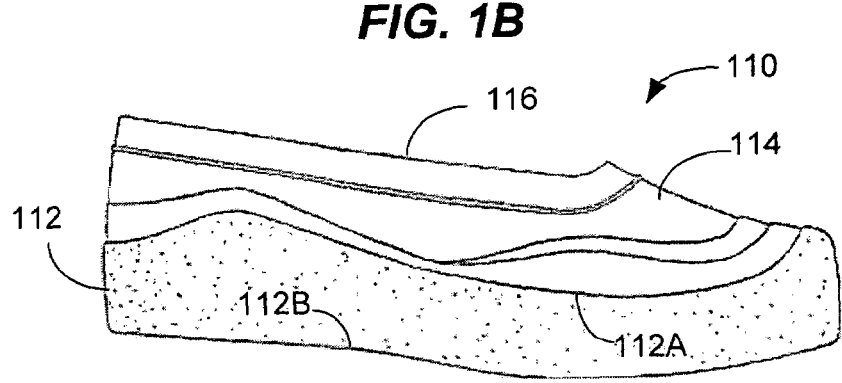
Figure 1C:
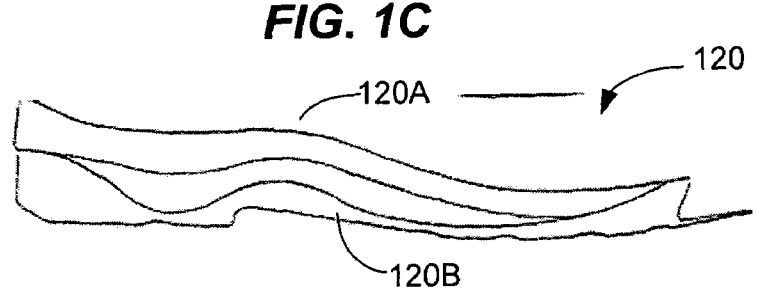
Figure 1D:
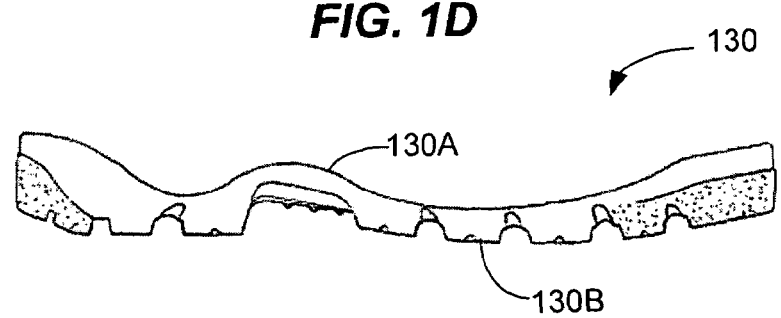
Figure 2A:
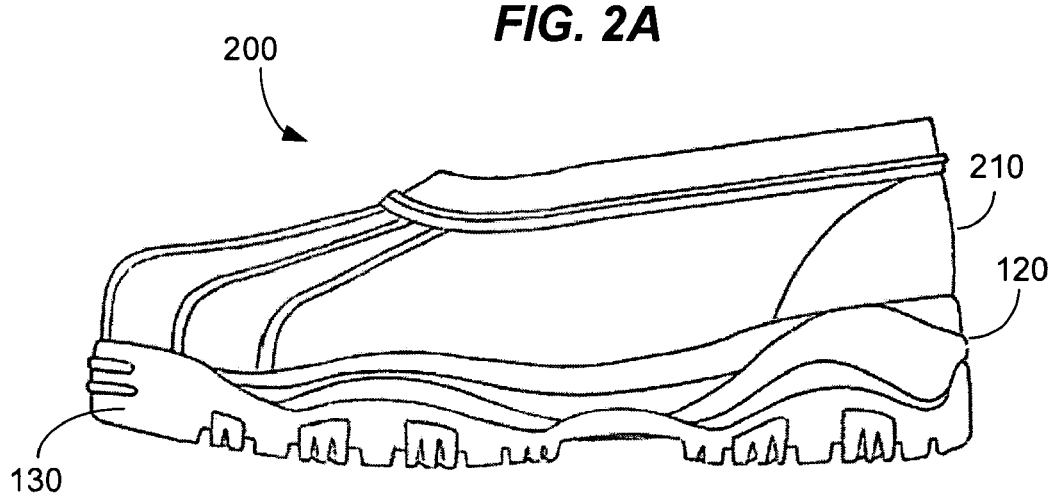
FIGS. 2A, 2B, 2C, and 2D illustrate another exemplary implementation of an integrated hybrid sole construction.
Figure 2B:
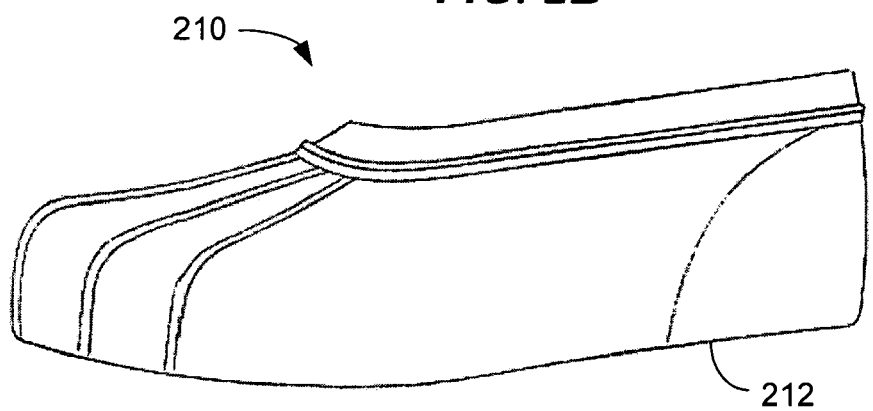
Figure 2C:
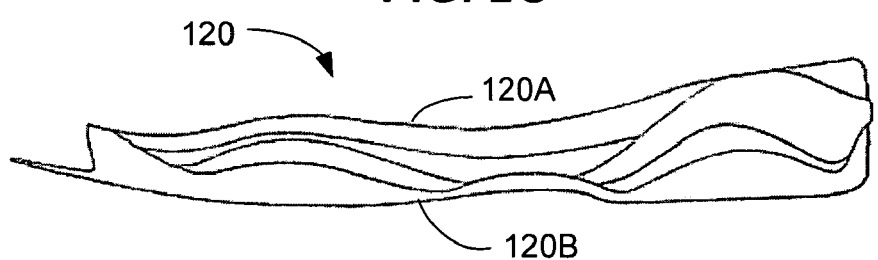
Figure 2D:
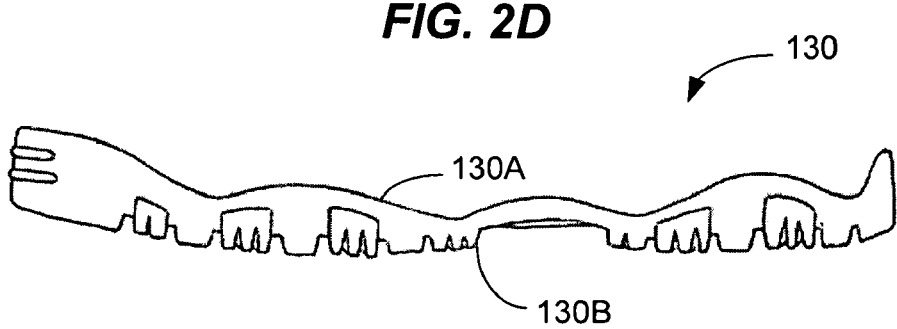

FIG. 1A illustrates one exemplary implementation of an integrated hybrid sole construction for footwear 100 according to one embodiment. The footwear 100 has a three-layer design with an upper portion 110, a middle sole 120, and a lower or outer sole 130. As illustrated, three parts 110, 120, and 130 are in direct contact with one another and are joint together to form a unitary construction by vulcanization. FIGS. 1B, 1C, and 1D illustrate the individual parts 110, 120, and 130, respectively.

FIG. 1B shows an exemplary structure of the upper portion 110 according to one embodiment. The upper portion 110 includes a rubber bottom component 112 and a top component 114 that are engaged to each other. An opening 116 is formed in the top component 114 to receive a foot of a user into the chamber in the upper portion 110. The top component 114 may be formed of a rubber or a different material. Generally, a liner and an insole may be formed inside the upper portion 110 to provide comfort to the user's foot. The liner may be formed of a fabric material such as cloth or other suitable materials. The insole may be designed to provide additional support and cushioning to the foot. The bottom component 112 has a top surface 112A engaged to the top component 114 and a bottom surface 112B to interface with the middle sole 120. This bottom component 112 is made of rubber. The rubber bottom component 112 may be completely unvulcanized or partially vulcanized so that a vulcanization treatment may be performed to cure the rubber to give it the desired material properties and at the same time join it to the middle sole 120 in a unibody construction.

Referring to FIG. 1D, the lower sole (outer sole) 130 is shown in this embodiment to have a top surface 130A for interfacing with the middle sole 120 and a bottom surface 130B operating as the bottom working surface of the footwear 100. This lower sole 130 is formed of rubber and is vulcanized during the vulcanization process to be cured and to join with the middle sole 120.

The rubber materials for the aforementioned components may be natural rubber or synthetic rubber. Such rubber may be chemically treated or "cured" by reacting with a vulcanizing agent such as sulfur under a heated condition at an elevated temperature (e.g., 350° C.). This vulcanization process is used to achieve the desired properties in the treated rubber, including elasticity, resistance to certain solvents, diminished surface tackiness, durability under low and high temperatures, resistance to rot or decay, and increased tensile strength. The vulcanization process essentially causes cross-linkages between the polymer chains of the rubber molecules. In addition to using sulfur as the vulcanizing agent, other agents, including certain peroxides, gamma radiation, and several other organic compounds, may also be used in the vulcanization process in this application.

The vulcanization process is also used to join two rubber parts in contact to form a unified structure. This is a known technique as used in the aforementioned U.S. Pat. No. 5,743,027 for joining the rubber middle sole to the rubber outer sole and the rubber upper portion. One aspect of the present techniques of this application is to do away with the rubber-made middle sole used in other rubber footwear while retaining the feature of joining different components by vulcanization as in fabrication of an all-rubber construction.

As shown in FIG. 1, the middle sole 120 in the footwear 100 is made of a non-rubber material lighter than the rubber materials for the lower sole 130 and the upper portion 110. The top and bottom surfaces 120A and 120B of the middle sole 120 may substantially conform to the lower surface 112B of the upper portion 110 and the upper surface 130A of the lower sole 130, respectively, to facilitate the engagement by vulcanization. In particular, this material for the middle sole 120 is capable of being vulcanized like rubber to join with a rubber component, thus forming a unitary structure.

One example of a suitable material for the middle sole 120 is a special polyurethane ("PU") that can be vulcanized as rubber. The weight density of this special PU is less than that of many rubber materials. Hence, the footwear 100 with this special PU for the middle sole 120 is lighter than the all-rubber counterpart with the same structure. Such light footwear is commercially desirable because lightweight is preferred or required for certain footwear products.

In general, the common polyurethane is a plastic compound that may be either thermosetting or thermoplastic. Such polyurethanes may be made into both flexible and rigid foams. The special PU used for the middle sole 120 in the footwear 100 in FIG. 1A may be plastic and somewhat rigid. Different from other PU materials, this special PU is designed to be capable of being vulcanized like rubber to form cross links with rubber. Preferably, this special PU can substantially retain its geometric shape and volume under the elevated temperature during the vulcanization process. As a result, the same vulcanization process for curing the rubber components can also unify the PU middle sole 120 with the rubber components 110 and 130 by cross linking. Hence, no separate process is needed nor an adhesive between the PU and rubber is necessary to engage the PU middle sole 120 to the upper and lower rubber parts. This reduces the processing steps and simplifies the fabrication.

Accordingly, a process for fabricating the footwear 100 in FIG. 1A may include the following steps. First, the rubber portion 110 and the rubber lower sole 130 are prepared with untreated rubber or partially treated rubber. The middle sole 120 is also prepared by using the special PU or another lightweight material that is capable of being vulcanized to cross link with rubber. Second, the middle sole 130 is placed between the upper portion 110 and the lower sole 130 to be in contact with one another. Next, the vulcanization process is performed to cure the rubber parts and to join the parts 110, 120, and 130 as a unitary structure. Finally, other steps are performed to complete the footwear 100.

FIGS. 2A, 2B, 2C, and 2D illustrate another exemplary footwear based on the above integrated and hybrid sole design. Different from the upper portion 110 in FIG. 1A, a unitary rubber upper portion 210 with a bottom rubber surface 212 is used. The fabrication process is similar to that for making the footwear 100.

Figure 3:
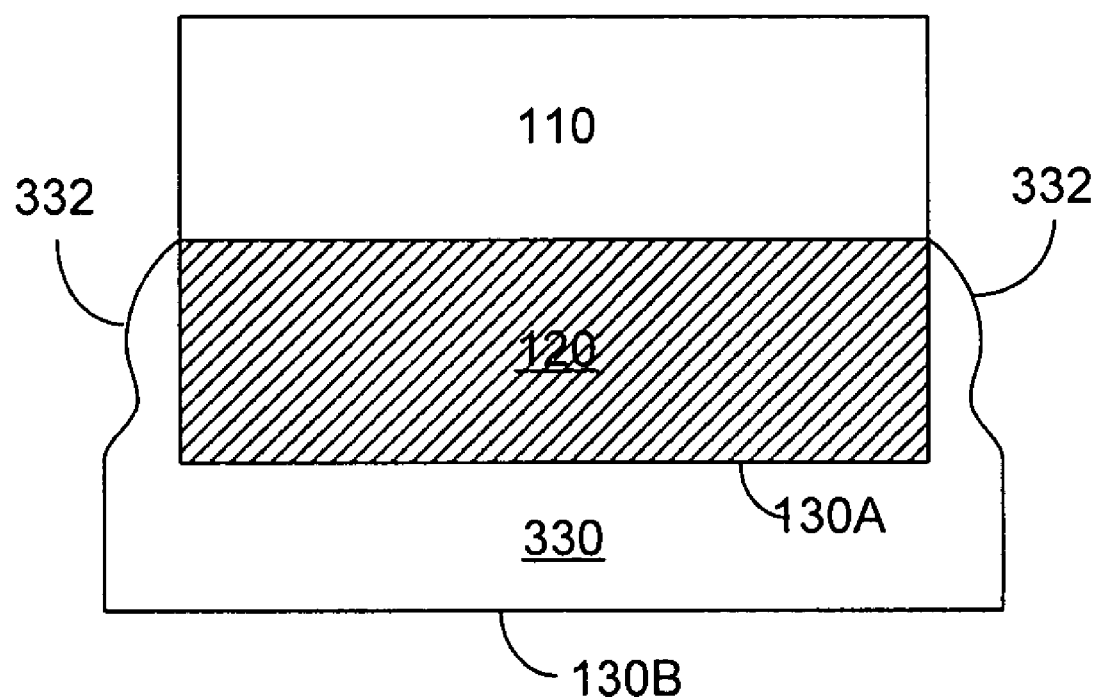
FIG. 3 shows a cross section of an integrated hybrid sole construction where the middle sole is not exposed and is covered by sides or fringes of at least one of the upper and lower rubber soles.

In the above embodiments, the side surfaces of the middle sole 120 are exposed. FIG. 3 further illustrates another embodiment where a lower sole 330 may be configured to have an upper rim part 332 to cover the side surfaces of the middle sole 120 when all three parts are in their proper positions. Upon completion of the vulcanization process, the rim part 332 is unified with the side surfaces of the middle sole 120 as an exterior which preferably completely covers the side surfaces of the middle sole 120. Since the rubber is generally more sturdy and durable than PU materials, the footwear with this design may be more durable than the design with exposed side surfaces of the PU middle sole 120. Alternatively, the upper portion 110 may be designed to have such a rubber rim to cover the exposed middle sole 120. In yet another variation, both the upper portion 110 and the lower sole 130 may have the rim portion 320.

Only a few embodiments are disclosed. However, it is understood that variations and enhancements may be made without departing from the spirit of and are intended to be encompassed by the following claims.

What is claimed is:

1. A footwear product, comprising:
   an upper portion having a bottom rubber surface;
   a middle sole formed of a non-rubber material that is a polyurethane capable of being vulcanized to cross link with rubber, having a first surface unified with said bottom rubber surface by cross linking and a second opposing surface; and
   a lower rubber sole having a top rubber surface that is unified with said second surface of said middle sole by cross linking, wherein the cross linking between the upper portion and the cross linking between the middle sole and the lower rubber sole and the middle portion are formed via a single vulcanization process.

2. The footwear product as in claim 1, wherein said non-rubber material has a weight density less than rubber.

3. The footwear product as in claim 1, wherein said lower rubber sole includes a rubber upper rim portion on peripheral of said top surface to cover exposed side surfaces of said middle sole.

4. The footwear product as in claim 1, wherein said upper portion includes a rubber rim portion on peripheral of said bottom rubber surface to cover exposed side surfaces of said middle sole.

5. The footwear product as in claim 1, wherein said upper portion includes a liner on inner surfaces.

6. The footwear product as in claim 5, wherein said liner is formed of a fabric.

7. The footwear product as in claim 1, wherein said upper portion includes an insole.

8. The footwear product as in claim 1, wherein said upper portion includes a first part and a second part which supports said bottom rubber surface.

9. The footwear product as in claim 8, wherein said first part is made of a material different from rubber.

10. The footwear product as in claim 8, wherein both said first and said second parts are made of rubber.

11. The footwear product as in claim 1, wherein said upper portion is a unitary rubber component.

* * * * *